No. 731,651. PATENTED JUNE 23, 1903.
J. J. ALLEN.
RACK FOR RUBBER TIRED VEHICLES.
APPLICATION FILED OCT. 15, 1902.
NO MODEL.

Witnesses:
Inventor:
J. J. Allen
By his attys.
Pennie & Goldsborough

No. 731,651.

Patented June 23, 1903.

UNITED STATES PATENT OFFICE.

JOHN J. ALLEN, OF PORTLAND, OREGON.

RACK FOR RUBBER-TIRED VEHICLES.

SPECIFICATION forming part of Letters Patent No. 731,651, dated June 23, 1903.

Application filed October 15, 1902. Serial No. 127,385. (No model.)

*To all whom it may concern:*

Be it known that I, JOHN J. ALLEN, a citizen of the United States, residing at Portland, county of Multnomah, State of Oregon, have invented certain new and useful Improvements in Supports or Racks for Rubber-Tire Vehicles; and I do hereby declare the following to be a full, clear, and exact description of the invention, such as will enable others skilled in the art to which it appertains to make and use the same.

This invention relates to supports or racks for bicycle-wheels, especially that class of bicycle-wheels using rubber tires.

It has for its object to provide a support which will firmly grip the rubber tire and thereby securely hold the bicycle in an upright position without engaging any part of the framework of the wheel or bicycle, thus avoiding possibility of injury to the wheel-felly or to the vehicle-frame.

The invention consists of a block or frame of any desired shape or configuration and preferably made of cement or artificial stone, having recesses formed therein for the purpose of receiving the wheels of bicycles and the like in such manner as to sustain the bicycle in an upright position by reason only of the compression of the rubber tire between the converging walls of the said recesses. It will thus be seen that no part of the bicycle comes in contact with the supporting-frame excepting the rubber tire, which is so firmly gripped and held between the walls of the recesses that the bicycle is securely held until removed.

Figure 1:
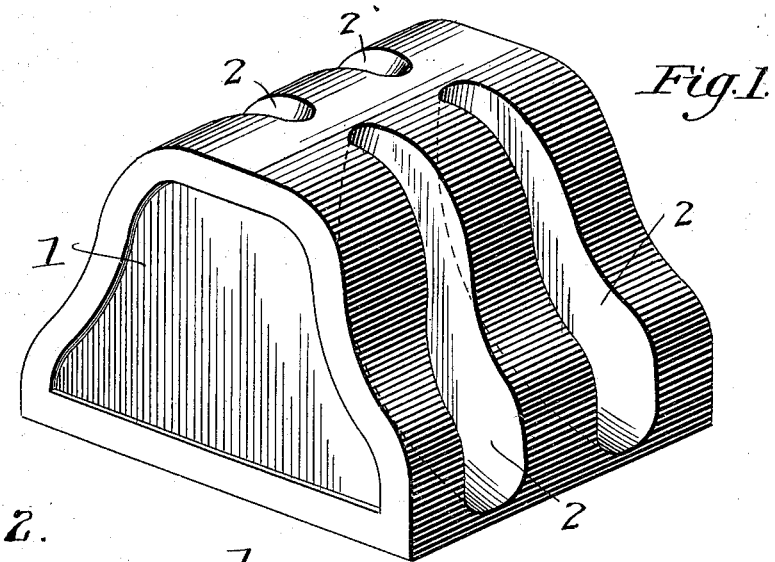
Figure 2:
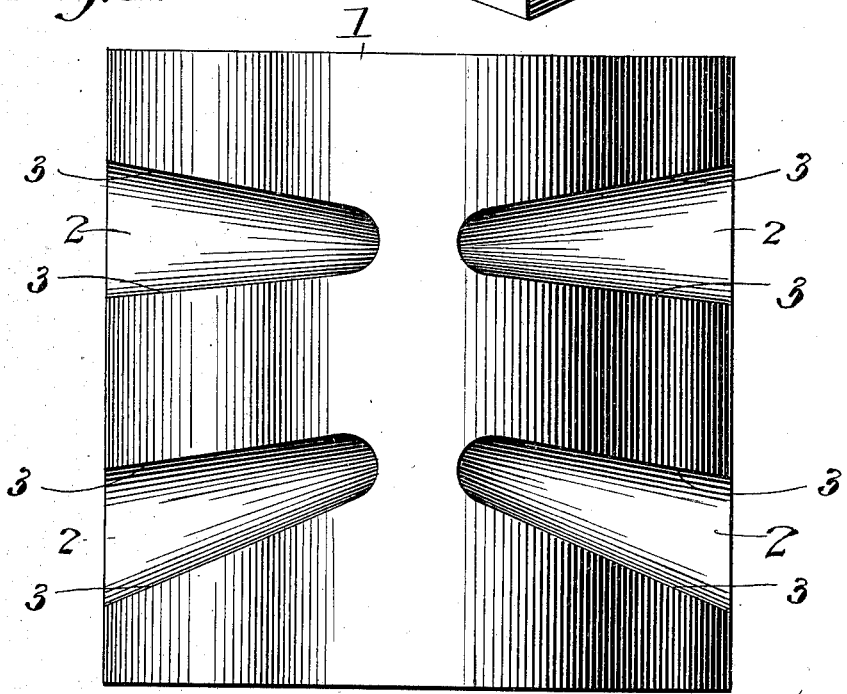

Referring to the drawings, Figure 1 represents a perspective view of the block or supporting-frame, and Fig. 2 is a plan view of the same.

In the drawings, 1 denotes a rack or support consisting of a block or frame of any desirable shape and of suitable size, having formed therein one or more recesses 2, each adapted for the purpose of receiving the wheel of the bicycle or like vehicle when it is desired to support the same in an upright position. Any appropriate number of these recesses may be provided, the same being preferably formed on the arc of a circle to conform to the circumference of the wheel. The support or rack is conveniently formed of general rectangular shape, having the recesses formed within the same on opposite sides thereof, as clearly shown in the drawings, although I do not limit myself to this exact arrangement, but hold myself at liberty to make such changes in the relative location of the recesses as fairly fall within the scope of the invention. The walls 3 3 of the recesses are made to gradually converge inwardly, thus providing for the reception of wheels carrying tires of different diameters. The wheel on entering the recess will be forced far enough therein to permit of the tire being wedged between the walls 3 3, and thus firmly compressed, as hereinbefore stated. This wedging action of the tire will firmly hold the vehicle in an upright position without the necessity of other supporting means.

Having thus described my invention, what I claim, and desire to secure by Letters Patent, is—

1. A holder or rack for bicycles and the like, consisting of an upstanding block having wheel-receiving recesses in its side faces, the walls of said recesses gradually converging horizontally from the side faces toward the center of the block.

2. A holder or rack for bicycles and the like, consisting of a block having wheel-receiving recesses in its side faces, the walls of said recesses gradually converging horizontally toward the center of the block.

In testimony whereof I affix my signature in presence of two witnesses.

JOHN J. ALLEN.

Witnesses:
W. J. MAKELIM,
MARIE ENGLISH.